(12) United States Patent
Furukawa et al.

(10) Patent No.: US 11,505,641 B2
(45) Date of Patent: Nov. 22, 2022

(54) PREPREG AND FIBER-REINFORCED COMPOSITE MATERIAL

(71) Applicant: Toray Industries, Inc., Tokyo (JP)

(72) Inventors: Koji Furukawa, Ehime (JP); Junko Kawasaki, Ehime (JP); Soichi Yoshizaki, Ehime (JP); Kentaro Sano, Ehime (JP); Toshiya Kamae, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 17 days.

(21) Appl. No.: 16/980,988

(22) PCT Filed: Feb. 27, 2019

(86) PCT No.: PCT/JP2019/007549
§ 371 (c)(1),
(2) Date: Sep. 15, 2020

(87) PCT Pub. No.: WO2019/181402
PCT Pub. Date: Sep. 26, 2019

(65) Prior Publication Data
US 2021/0371613 A1    Dec. 2, 2021

(30) Foreign Application Priority Data
Mar. 20, 2018 (JP) .............................. JP2018-052156

(51) Int. Cl.
C08G 59/32 (2006.01)
C08J 5/24 (2006.01)
C08G 59/40 (2006.01)
C08K 5/06 (2006.01)
C08L 63/00 (2006.01)

(52) U.S. Cl.
CPC ..... C08G 59/3227 (2013.01); C08G 59/4021 (2013.01); C08J 5/243 (2021.05); C08J 5/249 (2021.05); C08K 5/06 (2013.01); C08L 63/00 (2013.01); C08J 2363/00 (2013.01); C08L 2205/02 (2013.01)

(58) Field of Classification Search
CPC ....................................................... C08J 5/243
See application file for complete search history.

(56) References Cited

U.S. PATENT DOCUMENTS

| 2006/0057331 | A1 | 3/2006 | Lucas | |
|---|---|---|---|---|
| 2010/0143728 | A1* | 6/2010 | Tsuchikawa | C08G 73/12 428/457 |
| 2012/0276392 | A1* | 11/2012 | Takahashi | C08J 5/24 428/418 |
| 2013/0008695 | A1* | 1/2013 | Morita | C08G 59/245 174/250 |
| 2015/0210813 | A1 | 7/2015 | Arai et al. | |
| 2016/0083542 | A1* | 3/2016 | Cleaver | C08G 59/504 428/418 |
| 2016/0264745 | A1* | 9/2016 | Du | C08K 3/22 |
| 2016/0297959 | A1* | 10/2016 | Ishimoto | C08J 5/18 |
| 2017/0240690 | A1* | 8/2017 | Hirota | C08J 5/10 |
| 2018/0371243 | A1* | 12/2018 | Hu | B32B 27/281 |

FOREIGN PATENT DOCUMENTS

| JP | 11302412 A | 11/1999 |
|---|---|---|
| JP | 2007297487 A | 11/2007 |
| JP | 2007537331 A | 12/2007 |
| JP | 2014122312 A | 7/2014 |
| JP | 2017020004 A | 1/2017 |
| JP | 2017226745 A | 12/2017 |

OTHER PUBLICATIONS

International Search Report and Written Opinion for International Application No. PCT/JP2019/007549, dated May 21, 2019, 6 pages.

\* cited by examiner

*Primary Examiner* — Megan McCulley
(74) *Attorney, Agent, or Firm* — RatnerPrestia

(57) ABSTRACT

A prepreg having excellent tackiness as well as excellent resin strength after curing and strength in the non-fiber direction is described; and a fiber-reinforced composite material using the prepreg, where the prepreg is composed of reinforcing fibers and a resin composition which includes [A] an epoxy resin, [B] a dicyanamide and [C] a compound having a melting point of 130° C. or lower and a solubility parameter whose difference from the solubility parameter of [B] is 8 or less.

5 Claims, No Drawings

PREPREG AND FIBER-REINFORCED COMPOSITE MATERIAL

CROSS REFERENCE TO RELATED APPLICATIONS

This is the U.S. National Phase application of PCT/JP2019/007549, filed Feb. 27, 2019, which claims priority to Japanese Patent Application No. 2018-052156, filed Mar. 20, 2018, the disclosures of these applications being incorporated herein by reference in their entireties for all purposes.

FIELD OF THE INVENTION

The present invention relates to a prepreg having an excellent tackiness as well as an excellent resin strength after curing and strength in the non-fiber direction, and a fiber-reinforced composite material using the prepreg.

BACKGROUND OF THE INVENTION

Fiber-reinforced composite materials produced using carbon fibers, aramid fibers and the like, as reinforcing fibers, are widely used as structural materials for aircrafts, automobiles and the like, as well as sports and general industrial applications, such as tennis rackets, golf club shafts, fishing rods, bicycles and casings, taking advantage of their high specific strength and specific elastic modulus. For the production of fiber-reinforced composite materials, methods are used, such as, for example a method in which a plurality of plies of a prepreg, which is a sheet-like molding material obtained by impregnating reinforcing fibers with an uncured resin composition, are laminated, followed by heat-curing; a resin transfer molding method in which a liquid resin is poured onto reinforcing fibers placed in a mold, followed by heat-curing; and the like. Of the above described production methods, the method using a prepreg has an advantage in that a fiber-reinforced composite material with a high performance can be easily obtained, because the method enables to strictly control the orientation of the reinforcing fibers and provides a high degree of design freedom. A thermosetting resin is mainly used as the resin composition to be used in this prepreg, from the viewpoint of heat resistance and productivity. Among thermosetting resins, an epoxy resin is preferably used from the viewpoint of mechanical properties, such as adhesion to the reinforcing fibers. Further, dicyandiamide is often used as a curing agent, since the resulting cured product has excellent mechanical properties and heat resistance.

In recent years, improvements in various physical properties have been increasingly demanded, for the application of fiber-reinforced composite materials in golf club shafts, fishing rods, bicycles, automotive members, industrial members and the like, for which a further reduction in weight is demanded. For example, prepregs to be used in cylindrical molded products, such as golf club shafts and fishing rods, are required to have a high surface tackiness, in order to prevent the prepregs from peeling off when forming them into a cylindrical shape. The tackiness of such a prepreg is affected by the viscosity characteristics of the resin composition to be used in combination with reinforcing fibers. Therefore, in order to achieve a good tackiness, it is necessary to adjust the viscosity of the resin composition to equal to or higher than a certain value.

Further, in order to achieve an excellent flexural strength in the resulting cylindrical molded product, the fiber-reinforced composite material to be used needs to have a high strength in the non-fiber direction (hereinafter, sometimes also referred to as "90 degree tensile strength"), and the strength in the non-fiber direction is greatly affected by the strength of the resin cured product itself.

Patent Literature 1 discloses a prepreg which is produced using a resin composition containing dicyandiamide as a curing agent, and which has a good tackiness.

PATENT LITERATURE

Patent Literature 1: JP 2017-20004 A

SUMMARY OF THE INVENTION

However, since the resin composition used in the prepreg disclosed in Patent Literature 1 has a high viscosity, there were cases where the flowability of the composition was lost before dicyandiamide, used as the curing agent, was completely dissolved during the curing of the resin, and the dicyandiamide remained in the resulting cured product to cause defects. As a result, the strength of the cured product of the resin composition was decreased, resulting in a decrease in the strength in the non-fiber direction of the resulting fiber-reinforced composite material, in some cases. Further, when the viscosity of the resin composition was decreased in an attempt to reduce the amount of undissolved curing agent remaining in the cured product, there were cases where the resulting prepreg had a tackiness lower than the desired tackiness, resulting in a poor handleability. As described above, it has conventionally been extremely difficult to achieve an excellent tackiness as well as an excellent resin strength after curing and strength in the non-fiber direction, of a prepreg, in a balanced manner.

An object of the present invention is to provide: a prepreg having a high tackiness as well as an excellent resin strength after curing and strength in the non-fiber direction; and a fiber-reinforced composite material using the prepreg.

Solution to Problem

The present invention employs the following means in order to solve the above described problems. That is, the prepreg according to the present invention is a prepreg composed of reinforcing fibers and a resin composition, wherein the resin composition includes the following components [A] to [C]:

[A]: an epoxy resin;
[B]: a dicyandiamide; and
[C]: a compound which has a melting point of 130° C. or lower and a solubility parameter whose difference from the solubility parameter of [B] is 8 or less; and
wherein the resin composition has a viscosity at 25° C. of 1,000 Pa·s or more.

Further, the fiber-reinforced composite material according to the present invention is a fiber-reinforced composite material obtained by curing the above described prepreg.

The present invention enables to provide: a prepreg having an excellent tackiness as well as an excellent resin strength after curing and strength in the non-fiber direction; and a fiber-reinforced composite material using the prepreg.

DETAILED DESCRIPTION OF EMBODIMENTS OF THE INVENTION

Preferred examples of the reinforcing fibers to be used in the prepreg and the fiber-reinforced composite material according to the present invention include carbon fibers, graphite fibers, aramid fibers and glass fibers. Among these, carbon fibers are particularly preferred. The form and the arrangement the reinforcing fibers are not limited. For example, fiber structures such as continuous fibers arranged in one direction, single tows, woven fabrics, knitted fabrics, and braids are used. It is also possible to use, as the reinforcing fibers, two or more kinds of carbon fibers, glass fibers, aramid fibers, boron fibers, PBO fibers, ultra-high strength polyethylene fibers, alumina fibers, silicon carbide fibers and the like, in combination.

Specific examples of the carbon fibers include acrylic carbon fibers, pitch-based carbon fibers and rayon-based carbon fibers. In particular, acrylic carbon fibers having a high tensile strength are preferably used.

Examples of the form of the carbon fibers which can be used include twisted yarns, untwisted yarns and non-twisted yarns. The use of twisted yarns, however, causes a decrease in the mechanical properties of the resulting carbon fiber-reinforced composite material, since the filaments constituting the carbon fibers are not oriented in parallel. Therefore, preferably used are untwisted yarns or non-twisted yarns, which enable the resulting carbon fiber-reinforced composite material to have formability and strength properties in a well-balanced manner.

The carbon fibers preferably have a tensile elastic modulus within the range of from 200 to 440 GPa. The tensile elastic modulus of the carbon fibers is affected by the degree of crystallization of the graphite structure of the carbon fibers, and a higher degree of crystallization results in a more improved elastic modulus. The carbon fibers preferably have a tensile elastic modulus within the above described range, because the rigidity and the strength of the resulting carbon fiber-reinforced composite material can be balanced at a high level. The carbon fibers more preferably have an elastic modulus within the range of from 230 to 400 GPa, and still more preferably within the range of from 260 to 370 GPa. The tensile elastic modulus of the carbon fibers as used herein refers to a value measured in accordance with JIS R7601 (2006).

The resin composition to be included in the prepreg according to the present invention contains the components [A] to [C] as essential components. In the present invention, the term "component" is used to refer to a compound(s) contained in the composition.

The component [A] in the present invention is an epoxy resin(s) contained in the resin composition included in the prepreg according to the present invention. When the component [A] is an epoxy resin having two or more epoxy groups within one molecule, the glass transition temperature of a cured product obtained by heat curing the resin composition is increased to result in a high heat resistance, which is preferred. The resin composition may contain an epoxy resin having one epoxy group within one molecule, to the extent that the heat resistance and mechanical properties of the prepreg and the fiber-reinforced composite material according to the present invention are not significantly adversely affected.

Examples of such an epoxy resin include: epoxy resins such as diaminodiphenylmethane type epoxy resins, diaminodiphenyl sulfone type epoxy resins, aminophenol type epoxy resins, meta-xylenediamine type epoxy resins, 1,3-bis(aminomethyl)cyclohexane type epoxy resins, isocyanurate type epoxy resins and hydantoin type epoxy resins; and epoxy resins such as phenol novolac type epoxy resins, orthocresol novolac type epoxy resins, tris(hydroxyphenyl)methane type epoxy resins and tetraphenylolethane type epoxy resins. Among these, diaminodiphenylmethane type and aminophenol type epoxy resins are particularly preferably used, because of their good balance between physical properties.

These epoxy resins may be used singly, or may be used in an appropriate mixture.

In the component [A] in the present invention, it is preferred that 100 parts by mass of the component [A] contain from 40 to 90 parts by mass of an epoxy resin having three or more functional groups and containing a nitrogen atom within the molecule. When the amount of the epoxy resin (or resins) having three or more functional groups and containing a nitrogen atom within the molecule is adjusted to 40 parts by mass or more, a cured product having an excellent elastic modulus and heat resistance can be obtained. Further, when the amount of the epoxy resin having three or more functional groups and containing a nitrogen atom within the molecule is adjusted to 90 parts by mass or less, a cured product having an excellent elongation, strength and toughness can be obtained.

The epoxy resin having three or more functional groups and containing a nitrogen atom within the molecule may be, for example, an isocyanuric acid type epoxy resin, an aminophenol type epoxy resin, a diaminophenylmethane type epoxy resin, a diaminodiphenyl sulfone type epoxy resin, an m-xylenediamine type epoxy resin or an aminomethylcyclohexane type epoxy resin.

Examples of commercially available products of the isocyanuric acid type epoxy resin include "TEPIC®" S (manufactured by Nissan Chemical Industries, Ltd.), TEPIC G (manufactured by Nissan Chemical Industries, Ltd.), and ARALDITE®" PT 9810 (manufactured by Huntsman Advanced Materials, Inc.).

Examples of commercially available products of the aminophenol type epoxy resin include ELM 120 (manufactured by Sumitomo Chemical Co., Ltd.), ELM 100 (manufactured by Sumitomo Chemical Co., Ltd.), "jER®" 630 (manufactured by Mitsubishi Chemical Corporation), "ARALDITE®" MY 0510 (manufactured by Huntsman Advanced Materials, Inc.), and "ARALDITE®" MY 0600 (manufactured by Huntsman Advanced Materials, Inc.).

Examples of commercially available products of the diaminodiphenylmethane type epoxy resin include ELM 434 (manufactured by Sumitomo Chemical Co., Ltd.), "ARALDITE®" MY 720 (manufactured by Huntsman Advanced Materials, Inc.), "ARALDITE®" MY 721 (manufactured by Huntsman Advanced Materials, Inc.), "ARALDITE®" MY 9512 (manufactured by Huntsman Advanced Materials, Inc.), "ARALDITE®" MY 9663 (manufactured by Huntsman Advanced Materials, Inc.), and "EPOTOTE®" YH-434 (manufactured by Toto Kasei Co., Ltd.).

Examples of commercially available products of the diaminodiphenyl sulfone type epoxy resin include TG3DAS (manufactured by Mitsui Fine Chemicals, Inc.).

Examples of commercially available products of the m-xylenediamine type epoxy resin include "TETRAD®"-X (manufactured by Mitsubishi Gas Chemical Co., Ltd.).

Examples of commercially available products of the aminomethylcyclohexane type epoxy resin include "TETRAD®"-C (manufactured by Mitsubishi Gas Chemical Co., Ltd.).

The component [B] of the present invention is dicyandiamide. Dicyandiamide is excellent in that it imparts high mechanical properties and heat resistance to the resulting epoxy resin-cured product, and is widely used as a curing agent for epoxy resins. Further, dicyandiamide provides an excellent storage stability to the epoxy resin composition, and thus can be suitable used. Examples of commercially available products of dicyandiamide as described above include DICY 7 (manufactured by Mitsubishi Chemical Corporation) and DICY 15 (manufactured by Mitsubishi Chemical Corporation).

The resin composition according to the present invention preferably contains from 4 to 16 parts by mass, and more preferably from 6 to 10 parts by mass of the component [B], with respect to 100 parts by mass of the component [A]. When the component [B] is contained in an amount within the above described range, it is possible to obtain an epoxy resin-cured product having an excellent balance between the heat resistance and the mechanical properties.

The component [C] in the present invention is a compound which has a melting point of 130° C. or lower and a solubility parameter whose difference from the solubility parameter of the component [B] is 8 or less. When there is a small difference in the solubility parameter between the components [B] and [C], the dissolution of dicyandiamide as the component [B] is facilitated. The incorporation of the component [C] improves the solubility of dicyandiamide. This leads to a decrease in the amount of undissolved dicyandiamide, and thus, a decrease in the occurrence of defects. As a result, it is possible to obtain a resin cured product and a fiber-reinforced composite material having an excellent strength. Further, the component [C] of the present invention has a melting point of 130° C. or lower, more preferably 100° C. or lower, and still more preferably 80° C. or lower. In the case of incorporating dicyandiamide as a curing agent, the curing reaction of the resin composition starts at a temperature of from 80° C. to 130° C. Accordingly, when the melting point of the component [C] is within the above described temperature range, the component [C] exists in the form of liquid in the resin composition at the time of curing the resin composition or the prepreg, which leads to an improvement in the solubility of dicyandiamide. Further, when the component [C] has a lower melting point, the component [C] exists in the form of liquid at a lower temperature at the time of curing the resin composition. This enables to obtain an excellent effect of dissolving dicyandiamide, which is preferred.

The difference between the solubility parameter $B_{SP}$ of the component [B] and the solubility parameter $C_{SP}$ of the component [C], of the present invention, is 8 or less, more preferably 6 or less, and still more preferably 4 or less. The solubility parameter as used herein refers to a value at 25° C., and the unit thereof is $(cal/cm^3)^{1/2}$. It is noted that 1.00 $(cal/cm^3)^{1/2}$ corresponds to 2.05 $(J/cm^3)^{1/2}$.

The closer the values of $B_{SP}$ and $C_{SP}$, the higher the affinity between the component [B] and the component [C], and this enables to further reduce the amount of undissolved dicyandiamide remaining in the resulting resin cured product. As a result, the resulting cured product has an excellent strength.

The solubility parameter as used herein can be calculated uniquely, as the value at 25° C., using computer software, Hansen Solubility Parameter in Practice (HSPiP) (http://www.hansen-solubility.com), from the chemical structure of the component [B] or the component [C]. In the present invention, the solubility parameters $B_{SP}$ and $C_{SP}$ at 25° C. are calculated from the chemical structures of the component [B] and the component [C], respectively, using HSPiP ver. 5.0.06 (sold by Eizo Kobo Question).

Examples of the component [C] include: ethers such as diethylene glycol monoethyl ether, ethyl phenyl ether and ethylene glycol diethyl ether; amides such as dimethylformamide; sulfoxides such as dimethyl sulfoxide; and imides such as succinimide. These compounds may be used singly, or in combination of two or more kinds thereof.

The resin composition according to the present invention preferably contains from 1 to 10 parts by mass, more preferably from 2 to 8 parts by mass, and still more preferably from 3 to 6 parts by mass of the component [C], with respect to 100 parts by mass of the component [A]. When the amount of the component [C] with respect to 100 parts by mass of the component [A] is adjusted to equal to or higher than the above described preferred lower limit value of the component [C], the effect of dissolving dicyandiamide is effectively obtained, making it possible to reduce the amount of undissolved dicyandiamide which causes defects in the cured product. As a result, a cured product having an excellent strength can be obtained. Further, when the amount of the component [C] with respect to 100 parts by mass of the component [A] is adjusted to equal to or lower than the above described preferred upper limit value of the component [C], it is possible to prevent the inhibition of the curing reaction due to a decrease in the concentrations of the epoxy resin and the curing agent in the resin composition, and to reduce a decrease in the elastic modulus and the heat resistance of the resulting cured product.

The resin composition according to the present invention preferably contains from 30 to 250 parts by mass, more preferably from 50 to 150 parts by mass, and still more preferably from 60 to 100 parts by mass of the component [C], with respect to 100 parts by mass of the component [B].

When the amount of the component [C] with respect to 100 parts by mass of the component [B] is adjusted to equal to or higher than the above described preferred lower limit value of the component [C], the effect of dissolving dicyandiamide is effectively obtained, making it possible to reduce the amount of undissolved dicyandiamide which causes defects in the cured product. As a result, a cured product having an excellent strength can be obtained. Further, when the amount of the compound [C] with respect to 100 parts by mass of the component [B] is adjusted to equal to or lower than the above described upper limit value of the component [C], it is possible to prevent the inhibition of the curing reaction due to a decrease in the concentrations of the epoxy resin and the curing agent in the resin composition, and to reduce a decrease in the elastic modulus and the heat resistance of the resulting cured product.

It is preferred that all the compounds as the component [C] contained in the resin composition according to the present invention have a boiling point of 125° C. or higher, and more preferably 150° C. or higher. When the boiling point of the component [C] is adjusted within the above described range, the component [C] is less easily volatilized during the curing of the prepreg. This makes it possible not only to obtain a cured product with fewer voids and an excellent mechanical strength, but also to obtain the effect of improving the strength of the cured product even when the component [C] is incorporated in a small amount.

In the present invention, the epoxy resin(s) as the component [A] preferably has/have an average epoxy equivalent within the range of from 115 to 200 g/eq, and more preferably within the range of from 115 to 150 g/eq. When the component [A] has an average epoxy equivalent equal to or higher than the above described preferred lower limit value, a runaway reaction is less likely to occur during the curing of the epoxy resin(s). As a result, a decrease in the mechanical strength of the resulting cured product can be prevented, enabling to provide a carbon fiber-reinforced composite material with a stable quality. When the component [A] has an average epoxy equivalent equal to or lower than the above described preferred upper limit value, a cured product having an excellent elastic modulus and heat resistance can be obtained.

In cases where "n" kinds of epoxy resins are used in combination, the total amount of the epoxy resins is G parts by mass, and Wx parts by mass of an epoxy resin X having an epoxy equivalent of Ex (g/eq) is incorporated, the average epoxy equivalent of the component [A] can be calculated in accordance with the following Equation (1):

[Math. 1]

$$\text{Average epoxy equivalent } [g/eq] = \frac{G}{\left\{ \left(\frac{W_1}{E_1}\right) + \left(\frac{W_2}{E_2}\right) \ldots + \left(\frac{W_x}{E_x}\right) \ldots + \left(\frac{W_n}{E_n}\right) \right\}} \quad \text{Equation 1}$$

(wherein x represents 1, 2, 3, . . . or n).

The component [C] of the present invention is particularly suitably incorporated in combination with the component [A] having an average epoxy equivalent of 200 g/eq or less. When the component [A] has an average epoxy equivalent of 200 g/eq or less, a large number of epoxy groups are contained in the resin composition, and thus, a preferred amount of dicyandiamide to be incorporated as the curing agent is also increased. Accordingly, undissolved dicyandiamide which causes defects in the cured product is more likely to be generated. However, the incorporation of the component [C] enables to reduce the amount of undissolved dicyandiamide, as a result of which a marked effect of improving the strength of the resulting resin cured product and fiber-reinforced composite material can be obtained, as compared to the case in which the component [C] is not incorporated.

The resin composition to be used in the prepreg according to the present invention may contain a curing accelerator, from the viewpoint of controlling the curing rate. The curing accelerator may be, for example, a urea compound or an imidazole compound. In particular, a urea compound can be preferably used from the viewpoint of improving the storage stability of the epoxy resin composition.

Examples of the urea compound include 3-(3,4-dichlorophenyl)-1,1-dimethylurea, 3-(4-chlorophenyl)-1,1-dimethylurea, phenyl dimethyl urea and toluene bis(dimethylurea). Further, as a commercially available product of an aromatic urea compound, it is possible to use DCMU 99 (manufactured by Hodogaya Chemical Co., Ltd.), "Omicure®" 24 (manufactured by PTI Japan, Ltd.) or the like.

The resin composition to be used in the prepreg according to the present invention may contain a thermoplastic resin. The incorporation of a thermoplastic resin into the resin composition allows the control of the viscosity of the resin composition, the control of the tackiness of the prepreg, and the control of the flowability of the resin composition during the heat curing of the prepreg, without compromising the heat resistance of the resulting fiber-reinforced composite material. As the thermoplastic resin to be incorporated into the resin composition, it is preferred to use a thermoplastic resin having a high compatibility with the epoxy resin(s), and containing a hydrogen-bonding functional group capable of improving the adhesion between the resin(s) and the reinforcing fibers.

The resin composition to be used in the prepreg according to the present invention has a viscosity at 25° C. of 1,000 Pa·s or more, more preferably 10,000 Pa·s or more, and still more preferably 25,000 Pa·s or more. The viscosity as used herein refers to the complex viscosity $\eta^*$, as measured using an apparatus for measuring dynamic viscoelasticity (for example, a rheometer RDA2 (manufactured by Rheometrics, Inc.) or a rheometer ARES (manufactured by TA Instruments, Inc.)), and using parallel plates having a diameter of 40 mm, at a frequency of 0.5 Hz and a Gap of 1 mm. When the resin composition has a viscosity at 25° C. within the above described range, the resin is less easily flowable at room temperature when used in the prepreg, the variation in the content of the reinforcing fibers can be reduced, and in addition, a prepreg having a tackiness suitable for handling during the molding can be obtained. The tackiness as used herein refers to the stickiness of the resulting prepreg. When the prepreg has a sufficiently high tackiness, it is possible to reduce the peeling of the prepreg upon adhering the prepreg to a forming mold or adhering the plies of the prepreg to each other, and to provide an excellent handleability, which is preferred. Further, when the adhesion between the plies of the prepreg is high, voids are less easily formed between the laminated prepreg plies, which is preferred.

The prepreg according to the present invention can be produced by any of various known methods. For example, the prepreg can be produced by a method, such as a hot melt method in which the viscosity of the resin composition is decreased by heating, without using any organic solvent, to impregnate reinforcing fibers with the resin composition. In particular, the hot melt method is preferred, since voids are less likely to be formed in the resulting molded article, as compared to a wet method using an organic solvent.

Further, as the hot melt method, it is possible to use, for example, a method in which the reinforcing fibers are directly impregnated with the resin composition whose viscosity is decreased by heating, or alternatively, a method in which the resin composition is first coated on a release paper or the like to prepare a release paper sheet with a resin film (hereinafter, also simply referred to as "resin film"), and then the resin film is layered on both sides or one side of the reinforcing fibers, followed by heating and pressing, so as to impregnate the reinforcing fibers with the resin composition.

The content of the reinforcing fibers in the prepreg is preferably from 30 to 90% by mass, more preferably from 35 to 85% by mass, and still more preferably from 65 to 85% by mass. A low fiber mass content leads to too high an amount of the resin, relatively, making it difficult to obtain the advantages of the fiber-reinforced composite material of having an excellent specific strength and specific elastic modulus. Further, there are cases where the quantity of heat during the curing is excessively increased, at the time of molding the fiber-reinforced composite material. On the other hand, too high a fiber mass content may lead to a defective impregnation of the resin, possibly resulting in an increase in voids in the composite material to be obtained. Further, there is a risk of compromising the tackiness of the prepreg.

The fiber-reinforced composite material according to the present invention can be produced by a method, as one example, in which the plies of the prepreg according to the present invention described above are laminated in a predetermined form, followed by applying heat and pressure to cure the resin. Examples of the method of applying heat and pressure as used in the above method include a press molding method, an autoclave molding method, a bagging molding method, a wrapping tape method and an internal pressure molding method.

The fiber-reinforced composite material according to the present invention can be widely used in general industrial applications and sports applications. More specifically, in general industrial applications, the fiber-reinforced composite material can be suitably used in structures such as automobiles, marine vessels and railroad vehicles. In sports applications, the fiber-reinforced composite material can be suitably used in the applications of golf club shafts, fishing rods, tennis rackets and badminton rackets.

EXAMPLES

The present invention will now be described in detail with reference to Examples. It is noted, however, that the scope of the present invention is in no way limited to these Examples. In the following Examples, the unit "part(s)" used to describe any composition ratio refers to parts by mass, unless otherwise noted. The measurements of various properties (physical properties) were carried out under the environment of a temperature of 23° C. and a relative humidity of 50%, unless otherwise noted.

Materials Used in Examples and Comparative Examples (1) Reinforcing Fibers
"TORAYCA®" T1100G-24K (number of fibers: 24,000 pieces, tensile elastic modulus: 324 GPa, density: 1.8 g/cm$^3$, manufactured by Toray Industries, Inc.)

(2) Component [A]: Epoxy Resins
"ARALDITE®" MY 0500 (aminophenol type epoxy resin, epoxy equivalent: 118 g/eq, number of functional groups: 3, manufactured by Huntsman Advanced Materials, Inc.)
"ARALDITE®" MY 0600 (aminophenol type epoxy resin, epoxy equivalent: 118 g/eq, number of functional groups: 3, manufactured by Huntsman Advanced Materials, Inc.)
"Sumiepoxy®" ELM 434 (diaminodiphenylmethane type epoxy resin, epoxy equivalent: 120 g/eq, number of functional groups: 4, manufactured by Sumitomo Chemical Co., Ltd.)
"TEPIC®" S (isocyanuric acid type epoxy resin, epoxy equivalent: 100 g/eq, number of functional groups: 3, manufactured by Nissan Chemical Industries, Ltd.)
"AER®" 4001 (isocyanate-modified epoxy resin, epoxy equivalent: 290 g/eq, manufactured by Asahi Kasei E-Materials Corporation)
"EHPE®" 3150 (alicyclic epoxy resin, epoxy equivalent: 180 g/eq, manufactured by Daicel Corporation)
"jER®" 828 (bisphenol A type epoxy resin, epoxy equivalent: 170 g/eq, manufactured by Mitsubishi Chemical Corporation)
"jER®" 4004P (bisphenol F type epoxy resin, epoxy equivalent: 550 g/eq, manufactured by Mitsubishi Chemical Corporation)

(3) Component [B]: Dicyandiamide
DICY7 (dicyandiamide, B$_{SP}$: 16.0, manufactured by Mitsubishi Chemical Corporation)

(4) Component [C]:
Diethylene glycol monoethyl ether (melting point: −80° C., boiling point: 196° C., C$_{SP}$: 10.5, manufactured by Tokyo Chemical Industry Co., Ltd.)
Dimethylformamide (melting point: −61° C., boiling point: 153° C., C$_{SP}$: 12.0, manufactured by Tokyo Chemical Industry Co., Ltd.)
Dimethyl sulfoxide (melting point: 19° C., boiling point: 189° C., C$_{SP}$: 12.1, manufactured by Nakalai Tesque, Inc.)
Ethyl phenyl ether (melting point: −30° C., boiling point: 173° C., C$_{SP}$: 9.4, manufactured by Tokyo Chemical Industry Co., Ltd.)
Ethylene glycol diethyl ether (melting point: −74° C., boiling point: 121° C., C$_{SP}$: 8.3, manufactured by Tokyo Chemical Industry Co., Ltd.)
Succinimide (melting point: 124° C., boiling point: 287° C., C$_{SP}$: 15.5, manufactured by Tokyo Chemical Industry Co., Ltd.).
Dibutyl ether (melting point: −98° C., boiling point: 141° C., C$_{SP}$: 7.8, manufactured by Tokyo Chemical Industry Co., Ltd.) (this compound is used for comparison, and does not belong to the component [C] defined in the present invention)
Methylcyclopentane (melting point: −142° C., boiling point: 72° C., C$_{SP}$: 7.8, manufactured by Tokyo Chemical Industry Co., Ltd.) (this compound is used for comparison, and does not belong to the component [C] defined in the present invention)

(5) Curing Accelerator
2,4-Toluene bis(dimethylurea) ("Omicure®" 24, melting point: 188° C., manufactured by Emerald Performance Materials, LLC)

(6) Thermoplastic Resin
"VYNYLEC®" K (polyvinyl formal, manufactured by JNC Corporation)

<Evaluation Methods>
The properties of the epoxy resin composition and the prepreg of each of the Examples were measured, using the following measurement methods.

(1) Measurement of Viscosity of Resin Composition
The viscosity of the resin composition was measured using a dynamic viscoelasticity measuring apparatus ARES-2KFRTN1-FCO-STD (manufactured by TA Instruments, Inc.). Using flat parallel plates having a diameter of 25 mm for the upper and lower portions of a measuring fixture, the epoxy resin composition was set to the fixture such that the distance between the upper portion and the lower portion of the fixture is 1 mm, and then the measurement was carried out in the twisting mode (measuring frequency: 0.5 Hz). The temperature was increased from 20° C. to 30° C. at a rate of 1° C./min, and the measured complex elastic modulus at 25° C. was defined as the viscosity of the resin composition at 25° C.

(2) Three-Point Bending Measurement of Resin Cured Product
After degassing the uncured resin composition in vacuum, the resin composition was placed in a mold which had been set to a thickness of 2 mm with spacers made of 2 mm-thick "Teflon®". The resin composition was heated from 30° C. at a rate of 1.7° C./min and maintained at a temperature of 90° C. for 60 minutes, and then heated at a rate of 2.0° C./min and cured at a temperature of 135° C. for 120 minutes, to obtain a resin cured product in the form of a plate having a thickness of 2 mm. Test pieces each having a width of 10 mm and a length of 60 mm were cut out from the thus prepared resin cured product. Using an Instron Universal Testing Machine (manufactured by Instron Corporation), a three-point bending measurement was carried out in accordance with JIS K7171 (1994), at a span of 32 mm and a cross-head speed of 100 mm/min, with a sample number of n=6. The mean values of the measured values of the strength and the elastic modulus were defined as the flexural strength of the resin cured product and the flexural modulus of the resin cured product, respectively.

(3) Measurement of Glass Transition Temperature of Resin Cured Product

The epoxy resin composition was injected into the mold, and then placed in a hot air dryer. The epoxy resin composition was heated from 30° C. at a rate of 1.7° C./min and maintained at a temperature of 90° C. for 60 minutes, and then heated at a rate of 2.0° C./min and cured at a temperature of 135° C. for 120 minutes, to obtain a resin cured plate having a thickness of 2 mm. A test piece having a width of 12.7 mm and a length of 55 mm was cut out from the thus prepared resin cured plate. Thereafter, the glass transition temperature was determined by the DMA method, in accordance with SACMA SRM18R-94. In the resulting storage modulus G' curve, the temperature value at the intersection of the tangent line in the glassy state and the tangent line in the transition state was defined as the glass transition temperature. The measurement was carried out at a temperature increase rate of 5° C./min and a frequency 1 Hz.

(4) Measurement of Tackiness of Prepreg

The tackiness of the prepreg was measured using a tack tester (PICMA tack tester II: manufactured by Toyo Seiki Co., Ltd.). A cover glass in a size of 18 mm×18 mm was compression bonded to the prepreg at a force of 0.4 kgf (3.9 N) for 5 seconds. Then the resultant was pulled in the vertical direction at a rate of 30 mm/min, and the resistance force upon peeling was defined as the tack value.

(5) Definition of 90° in Fiber-Reinforced Composite Material

As described in JIS K7017 (1999), when the fiber direction of a unidirectional fiber-reinforced composite material was defined as the axial direction, and the axial direction was defined as the 0° axis, the direction orthogonal to the axis direction was defined as 90°.

(6) Measurement of 90 Degree Tensile Strength of Fiber-Reinforced Composite Material Twenty plies of a unidirectional prepreg were laminated, with the fiber direction of the prepreg plies aligned in the same direction, and placed in an autoclave. Under a pressure of 0.7 MPa, the laminated prepreg was heated from 30° C. at a rate of 1.7° C./min and maintained at a temperature of 90° C. for 60 minutes, and then heated at a rate of 2.0° C./min and molded at a temperature of 135° C. for 120 minutes, to obtain a unidirectional CFRP having a thickness of 2 mm. The 90 degree tensile strength was measured in accordance with JIS K7073 (1988). From the cured plate, unidirectional 90° tensile test pieces each having a length of 150±0.4 mm, a width of 20±0.2 mm and a thickness of 2±0.2 mm were prepared. Each test piece was measured by a test tensile tester at a cross-head speed of 1 mm/min. The measurement was carried out with a sample number of n=5, and the mean value of the measured values were defined as the 90 degree tensile strength.

(7) Observation of Resin Cured Product with Polarizing Microscope

After degassing the uncured resin composition in vacuum, the resin composition was placed in a mold which had been set to a thickness of 2 mm with spacers made of 2 mm-thick "Teflon®". The resin composition was heated from 30° C. at a rate of 1.7° C./min and maintained at a temperature of 90° C. for 60 minutes, and then heated at a rate of 2.0° C./min and cured at a temperature of 135° C. for 120 minutes, to obtain a resin cured product for observation in the form of a plate having a thickness of 2 mm. The polarized transmission observation of the resin cured product was carried out, using a polarizing light microscope (VHX-5000, equipped with a polarizing filter; manufactured by Keyence Corporation). Crystalline solids with double refraction and having a size of 3 μm or more were regarded as dicyandiamide, and the remaining amount thereof was evaluated. The amount of remaining undissolved dicyandiamide was evaluated in three stages, specifically: evaluated as "A" when the number of crystalline solids of dicyandiamide observed within the observation range of 1 mm×1 mm were from 0 to 60; evaluated as "B" when the number thereof were from 61 to 120; and evaluated as "C" when the number thereof were 121 or more.

Example 1

(Preparation of Resin Composition)

A resin composition was prepared by the following method.

The epoxy resins corresponding to the component [A] and the thermoplastic resin shown in Table 1 were introduced into a kneading apparatus. Then the resulting mixture was heated to a temperature of 150° C., and heat-kneaded at 150° C. for 1 hour to allow the thermoplastic resin to melt. Subsequently, the mixture was cooled to a temperature of from 55 to 65° C. while continuing kneading, and the component [B], the component [C] and the curing accelerator shown in Table 1 were added to the mixture, followed by stirring for 30 minutes, to obtain a resin composition.

(Preparation of Prepreg)

The resin composition obtained as described above was coated on release papers, using a knife coater, to prepare two pieces of resin film having a resin areal weight of 21 g/m². Subsequently, the thus obtained two pieces of resin film were layered on both surfaces of the carbon fibers, which had been arranged in one direction such that the fibers are in the form of a sheet having a fiber areal weight of 125 g/m². The resultant was heated and pressed under the conditions of a temperature of 110° C. and a maximum pressure of 1 MPa to impregnate the carbon fibers with the epoxy resin composition, to obtain a prepreg.

The composition of the components [A] to [C] in the prepreg were as shown below.

Component [A];
"ARALDITE®" MY0500: 35 parts
"TEPIC®" S: 35 parts
"jER®"828: 10 parts
"jER®" 4004P: 20 parts
Component [B];
DICY7: 8.0 parts
Component [C];
Diethylene glycol monoethyl ether: 5 parts At this time, the amount of the component [C] was 5 parts by mass with respect to 100 parts by mass of the component [A], and the amount of component [C] was 63 parts by mass with respect to 100 parts by mass of the component [B]. The component [A] had an average epoxy equivalent of 135 g/eq, [A], and 100 parts by mass of the component [A] contained 70 parts by mass of epoxy resins having three or more functional groups and containing a nitrogen atom within the molecule.

The resulting resin composition was subjected to the measurement in accordance with the section of "(1) Measurement of Viscosity of Resin Compositions" in the above described evaluation methods. As a result, the resin composition had a viscosity at 25° C. of 54,200 Pa·s.

Further, the resulting resin composition was subjected to the measurement in accordance with the section of "(2)

Three-point Bending Measurement of Resin Cured Product" in the above described evaluation methods. As a result, the resin composition had a flexural modulus of 5.3 GPa and a flexural strength of 187 MPa. Compared to the resin composition obtained in Comparative Example 1 (containing no component [C]) to be described later, an excellent resin flexural strength was obtained without compromising the elastic modulus. Further, the measurement was carried out in accordance with the section of "(3) Measurement of Glass Transition Temperature of Resin Cured Product". As a result, the resin cured product had a glass transition temperature of 131° C.

The resulting prepreg was subjected to the measurement in accordance with the section of "(4) Measurement of Tackiness of Prepreg" in the above described evaluation methods. As a result, the prepreg had a tack value of 0.30 kgf/cm² (0.029 MPa), achieving a good tackiness. Further, the prepreg plies were easily adhered to each other in a suitable manner, during prepreg lamination, and exhibited a good handleability.

The resulting prepreg was subjected to the measurement in accordance with the section of "(6) Measurement of 90 degree tensile strength of Fiber-reinforced Composite Material" in the above described evaluation methods. As a result, the prepreg had a tensile strength of 93 MPa, achieving a good tensile strength. Upon comparison with the prepreg obtained in Comparative Example 1 to be described later, it has been found out that the incorporation of component [C] improves the 90 degree tensile strength of the resulting fiber-reinforced composite material.

Examples 2 to 22

Resin compositions and prepregs were prepared in the same manner as in the above described Example 1, in accordance with the compositions shown in Tables 1 to 4. The resulting resin compositions and prepregs were subjected to the above described "(1) Measurement of Viscosity of Resin Compositions", "(2) Three-point Bending Measurement of Resin Cured Product", "(3) Measurement of Glass Transition Temperature of Resin Cured Product", "(4) Measurement of Tackiness of Prepreg", and "(6) Measurement of 90 degree tensile strength of Fiber-reinforced Composite Material". Results of the respective measurements in the Examples are as shown in Tables 1 and 2. Even in cases where the composition of the resin composition was changed as in each of Examples 2 to 22, an excellent flexural strength of the resin cured product, an excellent tackiness of the prepreg, and an excellent 90 degree tensile strength of the fiber-reinforced composite material were obtained.

Comparative Examples 1 to 5

Resin compositions and prepregs were prepared in the same manner as in the above described Example 1, in accordance with the compositions shown in Table 5. The resulting resin compositions and prepregs were subjected to the above described "(1) Measurement of Viscosity of Resin Compositions", "(2) Three-point Bending Measurement of Resin Cured Product", "(3) Measurement of Glass Transition Temperature of Resin Cured Product", "(4) Measurement of Tackiness of Prepreg", and "(6) Measurement of 90 degree tensile strength of Fiber-reinforced Composite Material".

In Comparative Example 1, the resin composition does not contain any compound corresponding to the component [C]. It can be seen from the comparison between Comparative Example 1 and Example 1 that the incorporation of the component [C] reduces the amount of the remaining undissolved dicyandiamide, and drastically improves the flexural strength of the resin cured product and the 90 degree tensile strength of the fiber-reinforced composite material.

In Comparative Example 2 and Comparative Example 3, dibutyl ether and methylcyclopentane were incorporated, respectively, instead of the component [C]. These compounds do not have a solubility parameter whose difference from the solubility parameter of [B] is 8 or less. It can be seen from the comparison between Comparative Example 2 and Example 1, and between Comparative Example 3 and Example 1 that, when the component [C] has a solubility parameter whose difference from the solubility parameter of [B] is 8 or less, the amount of the remaining undissolved dicyandiamide is reduced, and the flexural strength of the resin cured product and the 90 degree tensile strength of the fiber-reinforced composite material are drastically improved.

In Comparative Example 4 and Comparative Example 5, the resin compositions have a low viscosity at 25° C. The prepreg obtained in Comparative Example 4 had a low tack value, and the prepreg plies were not easily adhered to each other during prepreg lamination, showing a poor handleability. This reveals that, in the present invention, when the resin composition satisfies a specific viscosity, it is possible to impart an excellent tackiness to the resulting prepreg. Further, in Comparative Example 5, the component [C] is incorporated in an excessive amount. Accordingly, the gelation of the resin did not sufficiently proceed under the same curing conditions as those in Example 1, and it was impossible to measure various physical properties. In addition, the resin composition had a low viscosity, resulting in a failure to produce a resin film, and thus, it was impossible to measure the properties of the prepreg.

TABLE 1

|  |  | Example 1 | Example 2 | Example 3 | Example 4 | Example 5 |
|---|---|---|---|---|---|---|
| Component [A] | "ARALDITE" MY0500 | 35 | 35 | 35 | 35 | 35 |
|  | "ARALDITE" MY0600 |  |  |  |  |  |
|  | "Sumiepoxy" ELM434 |  |  |  |  |  |
|  | "TEPIC" S | 35 | 35 | 35 | 35 | 35 |
|  | "AER" 4001 |  |  |  |  |  |
|  | "EHPE" 3150 |  |  |  |  |  |
|  | "jER" 154 |  |  |  |  |  |
|  | "jER" 828 | 10 | 10 | 10 | 10 | 10 |
|  | "jER" 4004P | 20 | 20 | 20 | 20 | 20 |

TABLE 1-continued

| | | Example 1 | Example 2 | Example 3 | Example 4 | Example 5 |
|---|---|---|---|---|---|---|
| Component [B] | DICY7 | 8 | 8 | 8 | 8 | 8 |
| Component [C] | Diethylene glycol monoethyl ether | 5 | | | | |
| | Dimethylformamide | | 5 | | | |
| | Dimethyl sulfoxide | | | 5 | | |
| | Ethyl phenyl ether | | | | 5 | |
| | Ethylene glycol diethyl ether | | | | | 5 |
| | Succinimide | | | | | |
| | Dibutyl ether (for comparison) | | | | | |
| | Methylcyclopentane (for comparison) | | | | | |
| Curing accelerator | "Omicure" 24 | 1.5 | 1.5 | 1.5 | 1.5 | 1.5 |
| Thermoplastic resin | "VYNYLEC" K | 13 | 13 | 13 | 13 | 13 |
| Properties of materials | Average epoxy equivalent (g/eq) of [A] | 135 | 135 | 135 | 135 | 135 |
| Properties of resin composition | $B_{SP}$ $(cal/cm^3)^{1/2}$ of [B] | 16 | 16 | 16 | 16 | 16 |
| | $C_{SP}$ $(cal/cm^3)^{1/2}$ of [C] | 10.5 | 12 | 12.1 | 9.4 | 8.3 |
| | Difference between $B_{SP}$ and $C_{SP}$ $(cal/cm^3)^{1/2}$ | 5.5 | 4 | 3.9 | 6.6 | 7.7 |
| | Viscosity at 25° C. (Pa·s) | 54200 | 52600 | 54000 | 53700 | 559000 |
| | Flexural strength of cured product (MPa) | 187 | 186 | 190 | 188 | 178 |
| | Flexural modulus of cured product (GPa) | 5.3 | 5.3 | 5.4 | 5.4 | 5.3 |
| | Glass transition temperature of cured product (° C.) | 131 | 130 | 130 | 131 | 129 |
| | Remaining undissolved dicyandiamide | A | A | A | A | A |
| Properties of Prepreg | Tack value $(kgf/cm^2)$ | 0.30 | 0.30 | 0.30 | 0.30 | 0.31 |
| Properties of fiber-reinforced composite material | 90 degree tensile strength (MPa) | 93 | 93 | 95 | 94 | 88 |

TABLE 2

| | | Example 6 | Example 7 | Example 8 | Example 9 | Example 10 |
|---|---|---|---|---|---|---|
| Component [A] | "ARALDITE" MY0500 | | | | 35 | 35 |
| | "ARALDITE" MY0600 | 35 | 35 | 35 | | |
| | "Sumiepoxy" ELM434 | | | | | |
| | "TEPIC" S | 35 | 35 | 35 | 35 | 35 |
| | "AER" 4001 | | | | | |
| | "EHPE" 3150 | | | | | |
| | "jER" 154 | | | | | |
| | "jER" 828 | 10 | 10 | 10 | 10 | 30 |
| | "jER" 4004P | 20 | 20 | 20 | 20 | |
| Component [B] | DICY7 | 8 | 8 | 8 | 8 | 6 |
| Component [C] | Diethylene glycol monoethyl ether | 1.5 | 8 | 13 | | |
| | Dimethylformamide | | | | 2 | 15 |
| | Dimethyl sulfoxide | | | | | |
| | Ethyl phenyl ether | | | | | |

TABLE 2-continued

|  |  | Example 6 | Example 7 | Example 8 | Example 9 | Example 10 |
|---|---|---|---|---|---|---|
|  | Ethylene glycol diethyl ether |  |  |  |  |  |
|  | Succinimide |  |  |  |  |  |
|  | Dibutyl ether (for comparison) |  |  |  |  |  |
|  | Methylcyclopentane (for comparison) |  |  |  |  |  |
| Curing accelerator | "Omicure" 24 | 1.5 | 1.5 | 1.5 | 1.5 | 1.5 |
| Thermoplastic resin | "VYNYLEC" K | 13 | 13 | 13 | 13 | 15 |
| Properties of materials | Average epoxy equivalent (g/eq) of [A] | 135 | 135 | 135 | 135 | 121 |
| Properties of resin composition | $B_{SP}$ (cal/cm$^3$)$^{1/2}$ of [B] | 16 | 16 | 16 | 16 | 16 |
|  | $C_{SP}$ (cal/cm$^3$)$^{1/2}$ of [C] | 10.5 | 10.5 | 10.5 | 12 | 12 |
|  | Difference between $B_{SP}$ and $C_{SP}$ (cal/cm$^3$)$^{1/2}$ | 5.5 | 5.5 | 5.5 | 4 | 4 |
|  | Viscosity at 25° C. (Pa · s) | 67200 | 50200 | 37900 | 59200 | 48700 |
|  | Flexural strength of cured product (MPa) | 179 | 188 | 191 | 179 | 190 |
|  | Flexural modulus of cured product (GPa) | 5.6 | 5.4 | 5.4 | 5.3 | 5.2 |
|  | Glass transition temperature of cured product (° C.) | 134 | 126 | 119 | 133 | 120 |
|  | Remaining undissolved dicyandiamide | B | A | A | B | A |
| Properties of Prepreg | Tack value (kgf/cm$^2$) | 0.36 | 0.29 | 0.24 | 0.32 | 0.26 |
| Properties of fiber-reinforced composite material | 90 degree tensile strength (MPa) | 89 | 94 | 95 | 89 | 95 |

TABLE 3

|  |  | Example 11 | Example 12 | Example 13 | Example 14 | Example 15 | Example 16 |
|---|---|---|---|---|---|---|---|
| Component [A] | "ARALDITE" MY0500 | 35 |  |  |  | 35 | 35 |
|  | "ARALDITE" MY0600 |  |  | 50 | 40 |  |  |
|  | "Sumiepoxy" ELM434 |  | 50 | 10 |  |  |  |
|  | "TEPIC" S | 35 | 35 |  |  | 35 | 35 |
|  | "AER" 4001 |  |  |  | 10 |  |  |
|  | "EHPE" 3150 |  |  |  | 20 |  |  |
|  | "jER" 154 |  |  |  |  |  |  |
|  | "jER" 828 | 30 | 15 |  | 30 | 15 | 10 |
|  | "jER" 4004P |  |  | 40 |  | 15 | 20 |
| Component [B] | DICY7 | 6 | 8 | 8 | 9 | 8 | 8 |
| Component [C] | Diethylene glycol monoethyl ether |  |  |  |  | 5 | 5 |
|  | Dimethylformamide | 17 |  |  |  |  |  |
|  | Dimethyl sulfoxide | 17 | 5 | 5 | 5 |  |  |
|  | Ethyl phenyl ether |  |  |  |  |  |  |
|  | Ethylene glycol diethyl ether |  |  |  |  |  |  |

TABLE 3-continued

|  |  | Example 11 | Example 12 | Example 13 | Example 14 | Example 15 | Example 16 |
| --- | --- | --- | --- | --- | --- | --- | --- |
|  | Succinimide |  |  |  |  |  |  |
|  | Dibutyl ether (for comparison) |  |  |  |  |  |  |
|  | Methylcyclopentane (for comparison) |  |  |  |  |  |  |
| Curing accelerator | "Omicure" 24 | 1.5 | 1.5 | 1.5 | 1.5 | 1.5 | 1.5 |
| Thermoplastic resin | "VYNYLEC" K | 15 | 16 | 10 | 13 |  | 6 |
| Properties of materials Properties of resin composition | Average epoxy equivalent (g/eq) of [A] | 121 | 117 | 172 | 151 | 135 | 135 |
|  | $B_{SP}$ $(cal/cm^3)^{1/2}$ of [B] | 16 | 16 | 16 | 16 | 16 | 16 |
|  | $C_{SP}$ $(cal/cm^3)^{1/2}$ of [C] | 12 | 12.1 | 12.1 | 12.1 | 10.5 | 10.5 |
|  | Difference between $B_{SP}$ and $C_{SP}$ $(cal/cm^3)^{1/2}$ | 4 | 3.9 | 3.9 | 3.9 | 5.5 | 5.5 |
|  | Viscosity at 25° C. (Pa · s) | 44100 | 59600 | 46800 | 48300 | 1200 | 9800 |
|  | Flexural strength of cured product (MPa) | 190 | 188 | 184 | 187 | 192 | 190 |
|  | Flexural modulus of cured product (GPa) | 5.3 | 5.4 | 4.8 | 5 | 5.2 | 5.3 |
|  | Glass transition temperature of cured product (° C.) | 118 | 134 | 135 | 130 | 132 | 130 |
|  | Remaining undissolved dicyandiamide | — | — | — | — | — | — |
| Properties of Prepreg | Tack value (kgf/cm²) | 0.24 | 0.33 | 0.27 | 0.28 | 0.10 | 0.14 |
| Properties of fiber-reinforced composite material | 90 degree tensile strength (MPa) | 95 | 94 | 91 | 94 | 96 | 95 |

TABLE 4

|  |  | Example 17 | Example 18 | Example 19 | Example 20 | Example 21 | Example 22 |
| --- | --- | --- | --- | --- | --- | --- | --- |
| Component [A] | "ARALDITE" MY0500 | 35 |  | 50 | 25 |  | 35 |
|  | "ARALDITE" MY0600 |  | 25 |  |  |  |  |
|  | "Sumiepoxy" ELM434 |  |  |  |  | 60 |  |
|  | "TEPIC" S | 35 | 15 | 40 | 10 | 35 | 35 |
|  | "AER" 4001 |  | 15 |  | 35 |  |  |
|  | "EHPE" 3150 |  |  |  |  |  |  |
|  | "jER" 154 |  |  |  |  |  |  |
|  | "jER" 828 | 10 |  | 10 | 5 |  | 10 |
|  | "jER" 4004P | 20 | 45 |  | 25 | 5 | 20 |
| Component [B] | DICY7 | 8 | 6 | 10 | 6 | 10 | 8 |
| Component [C] | Diethylene glycol monoethyl ether | 5 |  |  |  |  |  |
|  | Dimethylformamide |  | 5 | 5 | 5 | 5 |  |
|  | Dimethyl sulfoxide |  |  |  |  |  |  |
|  | Ethyl phenyl ether |  |  |  |  |  |  |
|  | Ethylene glycol diethyl ether |  |  |  |  |  |  |

TABLE 4-continued

| | | Example 17 | Example 18 | Example 19 | Example 20 | Example 21 | Example 22 |
|---|---|---|---|---|---|---|---|
| | Succinimide | | | | | | 5 |
| | Dibutyl ether (for comparison) | | | | | | |
| | Methylcyclopentane (for comparison) | | | | | | |
| Curing accelerator | "Omicure" 24 | 1.5 | 1.5 | 1.5 | 1.5 | 1.5 | 1.5 |
| Thermoplastic resin | "VYNYLEC" K | 10 | 8 | 15 | 10 | 13 | 13 |
| Properties of materials | Average epoxy equivalent (g/eq) of [A] | 135 | 202 | 113 | 197 | 116 | 135 |
| Properties of resin composition | $B_{SP}$ (cal/cm$^3$)$^{1/2}$ of [B] | 16 | 16 | 16 | 16 | 16 | 16 |
| | $C_{SP}$ (cal/cm$^3$)$^{1/2}$ of [C] | 10.5 | 12 | 12 | 12 | 12 | 15.5 |
| | Difference between $B_{SP}$ and $C_{SP}$ (cal/cm$^3$)$^{1/2}$ | 5.5 | 4 | 4 | 4 | 4 | 0.5 |
| | Viscosity at 25° C. (Pa · s) | 24900 | 62100 | 55800 | 51600 | 52500 | 53100 |
| | Flexural strength of cured product (MPa) | 190 | 178 | 176 | 184 | 175 | 173 |
| | Flexural modulus of cured product (GPa) | 5.3 | 4.5 | 5.4 | 4.7 | 5.5 | 5.3 |
| | Glass transition temperature of cured product (° C.) | 131 | 121 | 129 | 120 | 136 | 134 |
| | Remaining undissolved dicyandiamide | — | — | B | — | — | B |
| Properties of Prepreg | Tack value (kgf/cm$^2$) | 0.21 | 0.34 | 0.31 | 0.29 | 0.29 | 0.30 |
| Properties of fiber-reinforced composite material | 90 degree tensile strength (MPa) | 95 | 87 | 87 | 91 | 86 | 86 |

TABLE 5

| | | Comparative Example 1 | Comparative Example 2 | Comparative Example 3 | Comparative Example 4 | Comparative Example 5 |
|---|---|---|---|---|---|---|
| Component [A] | "ARALDITE" MY0500 | 35 | 35 | 35 | 35 | |
| | "ARALDITE" MY0600 | | | | | |
| | "Sumiepoxy" ELM434 | | | | | |
| | "TEPIC" S | 35 | 35 | 35 | 30 | |
| | "AER" 4001 | | | | | |
| | "EHPE" 3150 | | | | | |
| | "jER" 154 | | | | | 35 |
| | "jER" 828 | 10 | 10 | 10 | 35 | 35 |
| | "jER" 4004P | 20 | 20 | 20 | | 30 |
| Component [B] | DICY7 | 8 | 8 | 8 | 6 | 4 |
| Component [C] | Diethylene glycol monoethyl ether | | | | 5 | |
| | Dimethylformamide | | | | | 113 |
| | Dimethyl sulfoxide | | | | | |
| | Ethyl phenyl ether | | | | | |

TABLE 5-continued

|  |  | Comparative Example 1 | Comparative Example 2 | Comparative Example 3 | Comparative Example 4 | Comparative Example 5 |
|---|---|---|---|---|---|---|
|  | Ethylene glycol diethyl ether |  |  |  |  |  |
|  | Succinimide |  |  |  |  |  |
|  | Dibutyl ether (for comparison) |  | 3 |  |  |  |
|  | Methylcyclopentane (for comparison) |  |  | 3 |  |  |
| Curing accelerator | "Omicure" 24 | 1.5 | 1.5 | 1.5 | 1.5 | 4 |
| Thermoplastic resin | "VYNYLEC" K | 8 | 8 | 8 |  | 5 |
| Properties of materials Properties of resin composition | Average epoxy equivalent (g/eq) of [A] | 135 | 135 | 135 | 125 | 220 |
|  | $B_{SP}$ (cal/cm$^3$)$^{1/2}$ of [B] | 16 | 16 | 16 | 16 | 16 |
|  | $C_{SP}$ (cal/cm$^3$)$^{1/2}$ of [C] | — | 7.8 | 7.8 | 10.5 | 12 |
|  | Difference between $B_{SP}$ and $C_{SP}$ (cal/cm$^3$)$^{1/2}$ | — | 8.2 | 8.2 | 5.5 | 4 |
|  | Viscosity at 25° C. (Pa·s) | 62300 | 52900 | 53600 | 900 | 2 |
|  | Flexural strength of cured product (MPa) | 158 | 156 | 159 | 189 | — |
|  | Flexural modulus of cured product (GPa) | 5.5 | 5.4 | 5.4 | 5 | — |
|  | Glass transition temperature of cured product (° C.) | 133 | 126 | 125 | 126 | — |
|  | Remaining undissolved dicyandiamide | C | C | C | A | — |
| Properties of Prepreg | Tack value (kgf/cm$^2$) | 0.34 | 0.30 | 0.30 | 0.05 | — |
| Properties of fiber-reinforced composite material | 90 degree tensile strength (MPa) | 81 | 80 | 79 | 93 | — |

The invention claimed is:

1. A prepreg composed of reinforcing fibers and a resin composition,
   wherein the resin composition comprises the following [A] to [C]:
   [A]: an epoxy resin;
   [B]: a dicyandiamide; and
   [C]: a compound which has a melting point of 130° C. or lower and a boiling point of 173° C. or higher, and a solubility parameter whose difference from the solubility parameter of [B] is 8 or less, and which is selected from ethers, amides, sulfoxides and imides;
   wherein the resin composition comprises from 1 to 10 parts by mass of [C] with respect to 100 parts by mass of [A],
   wherein the resin composition comprises from 30 to 250 parts by mass of [C] with respect to 100 parts by mass of [B], and
   wherein the resin composition has a viscosity at 25° C. of 1,000 Pa·s or more.

2. The prepreg according to claim 1, wherein the component [A] has an average epoxy equivalent of from 115 to 200 g/eq.

3. The prepreg according to claim 1, wherein 100 parts by mass of the component [A] comprises from 40 to 90 parts by mass of an epoxy resin having three or more functional groups and containing a nitrogen atom within the molecule.

4. A fiber-reinforced composite material obtained by curing the prepreg according to claim 1.

5. The prepreg according to claim 1, wherein the reinforcing fibers are carbon fibers.

* * * * *